Patented May 30, 1950

2,509,869

UNITED STATES PATENT OFFICE 2,509,869

HYDROCARBON SYNTHESIS

Isidor Kirshenbaum, Rahway, N. J., assignor to Standard Oil Development Company, a corporation of Delaware No Drawing. Application October 1, 1947, Serial No. 777,374

3 Claims. (Cl. 260—449.6)

The present invention relates to catalytic conversions and improved catalysts therefor. More particularly, the invention is concerned with improved iron catalysts for the catalytic synthesis of normally liquid hydrocarbons and oxygenated compounds from CO and $H_2$.

Iron type catalysts are normally employed in the synthesis of hydrocarbons at relatively high temperatures of about 450°–800° F. and relatively high pressures of about 3–100 atmospheres abs. or higher, to obtain predominantly unsaturated and oxygenated products from which motor fuels with high octane ratings may be recovered.

The extreme temperature sensitivity and relatively rapid catalyst deactivation of the hydrocarbon synthesis have led, in recent years, to various attempts and proposals to employ the so-called fluid catalyst technique wherein the synthesis gas is contacted with a dense turbulent bed of finely divided catalyst fluidized by the gaseous reactants and products. This technique permits catalyst replacement without interruption of the process and greatly improved temperature control. However, the adaptation of the hydrocarbon synthesis to the fluid catalyst technique has encountered serious difficulties, particularly when iron catalysts are used.

Application of the fluid technique requires in addition to the conventional characteristics determining catalyst activity, such as total desired yield and active catalyst life, ease of fluidization and attrition resistance. It is also desirable that the catalyst be active in the temperature range above 600° F. and still be highly selective to $C_4+$ hydrocarbons, since under these conditions high octane motor fuels are obtained. None of the prior art iron catalysts complies satisfactorily with all of these requirements.

Iron catalysts are usually prepared by the reduction of various natural or synthetic iron oxides or by the decomposition of iron carbonyls, the catalytic activity being enhanced by the addition of such promoters as various compounds of alkali metals or the oxides of chromium, zinc, aluminum, magnesium, manganese, the rare earth metals and others in small amount of about 1–10%. While some of these catalysts exhibit excellent activity characteristics they are without exception deficient with respect to ease of fluidization, and/or attrition resistance particularly when used in commercial runs of several hundred hours duration. Even fluidized catalysts obtained from sintered iron, which have been found to exhibit excellent fluidization and attrition characteristics show signs of disintegration in long run operation.

This general lack of mechanical resistance or steady decrease of mechanical strength during operation has been found to be closely connected to a high rate of carbon deposition on the catalyst, encountered at the conditions required by the synthesis using iron catalysts. The catalyst disintegration which accompanies excessive carbon deposition is believed to be the result of a migration of carbon into the iron lattice by the mechanism of interstitial carbide formation followed by disintegration of the carbide to free carbon. This process may continue until the catalyst mass contains about 99% of carbon.

It will be appreciated from the above that an iron catalyst of satisfactory synthesizing activity, selectivity, and catalyst life, which may be used in commercial operation without substantial catalyst disintegration and carbon deposition, is a need strongly felt in the synthesis art. This drawback of iron catalysts has been the major obstacle in all attempts to apply the fluid catalyst technique to the iron-catalyzed hydrocarbon synthesis. The present invention overcomes this obstacle.

It is, therefore, the principal object of the present invention to provide improved iron catalysts for the catalytic synthesis of hydrocarbons from CO and $H_2$.

A further object of my invention is to provide an improved hydrocarbon synthesis process operating in the presence of iron catalysts which are not subject to excessive disintegration and carbon deposition.

A more specific object of my invention is to provide an improved hydrocarbon synthesis process employing the fluid catalyst technique in the presence of iron catalysts of highest disintegration resistance throughout runs of commercial length.

Other and further objects and advantages of my invention will appear hereinafter.

In accordance with the present invention, carbon deposition on iron synthesis catalysts is substantially reduced and catalyst disintegration correspondingly suppressed, while activity, selectivity and catalyst life are maintained at highest levels when the iron is supported on a chromia type base such as $Cr_2O_3$. The relative proportions of the elements in the catalysts of the present invention may vary within wide limits. However, the iron content should not be substantially lower than about 0.5% by weight. Active chromia type supported catalysts with over-all concentrations of less than about 0.5% by weight may also be made provided that the iron is properly distributed on the surface of the catalysts. A distribution of about 5-40% by weight of iron calculated as $Fe_2O_3$ and about 60-90% by weight of chromia is generally preferred. The activity and selectivity of the catalysts of the present invention may be further enhanced by the addition of small amounts of conventional promoters such as the halides, oxides or carbonates of alkali metals, preferably potassium carbonate in proportions of about 0.5-5% by weight of the total catalyst.

The catalysts of the invention may be prepared by any suitable method of coprecipitation, precipitation of the iron component on the precipitated support, impregnation, or mechanical mixing, known per se in the art of catalyst manufacture, followed by reduction. A simple and expedient method of adding the iron, especially in very low concentrations, to the surface of the catalyst is by the decomposition of iron carbonyl upon the catalyst. However, superior results have been obtained when using the method of precipitating the iron component on the chromia support.

The invention will be further illustrated by the following specific example.

*Example*

To a slurry of 640 gms. of finely powdered chromium oxide in 2 liters of water was added a solution of 811 gms. ferric nitrate [$Fe(NO_3)_3.9H_2O$] in 2 liters of water. Then, with vigorous stirring, a solution of 400 cc. of concentrated $NH_4OH$ in 2 liters of water was added slowly. After stirring for two hours, the precipitate was filtered, washed with two liters of water, reslurried, filtered, and rewashed. To half of the wet filter cake was added enough water to make a paste, which was then mixed with an aqueous solution containing 8 gm. of $K_2CO_3$. This was dried, pilled and calcined at 850° F. for three hours in a $CO_2$ atmosphere. The final product consisted of about 80 parts by weight of $Cr_2O_3$, 20 parts by weight of $Fe_2O_3$ and 2 parts by weight of $K_2CO_3$.

The catalyst was reduced at 900° F. with hydrogen at 1 atmosphere at 1,000 v./v./hr. and tested at a feed ratio of $H_2/CO=1$, a throughput of 400 v./v./hr. and a pressure of 250 lbs. per sq. in. The results were as follows:

Synthesis temp., °F _____ 600
CO conversion, per cent_____ 95
$C_4$+yield, cc./cu. m. of feed consumed_____ 190

Carbon formation was only a fraction of that of conventional iron catalysts of comparable activity and selectivity indicating a superior resistance to disintegration. Thus, after 277 hours on stream the catalyst contained 2.5% carbon (as carbonate plus deposited carbon), whereas a catalyst consisting of 99% $Fe_2O_3$ and 1% KF tested under the same conditions contained 5.85% deposited carbon after 140 hours on stream, i. e. after about one-half the time on stream. The catalyst of the invention thus combines highest activity and liquid product selectivity with low carbon forming tendencies and high resistance to attrition and disintegration.

While the above experimental data were obtained in fixed bed operation, the catalysts of the invention compare just as favorably with conventional iron type catalysts in fluid operation, even though the high gas throughputs, high recycle ratios and high catalyst turbulence typical for fluid operation quite generally cause a slight decrease of conversion and liquid product yields and an appreciable increase of carbon formation and catalyst disintegration. It follows that the catalysts of the present invention, as the result of the combination of reduced carbonization and disintegration tendencies with excellent liquid product selectivity and activity are particularly useful for fluid operation. Catalysts in accordance with the present invention, suitable for fluid operation, may be prepared substantially as outlined above and sized to particle sizes of about 20-150 microns, preferably 50-100 microns. The conditions of fluid synthesis operation are well known in the art and need not be specified here in detail for a proper understanding of the invention by those skilled in the art. Briefly, these conditions may include catalyst particle sizes of 20-200 microns, superficial linear gas velocities of about 0.1-3 ft. per second, bed densities of about 10-120 lbs. per cu. ft., $H_2:CO$ ratios of about 0.5-3, gas recycle ratios of about 0-5, temperatures of about 550°-750° F., and pressures of about 150-650 lbs. per sq. in.

The present invention is not to be limited by any theory of the mechanism of the process or catalyst nor to any examples given merely for illustration purposes, but only by the following claims in which I wish to claim all novelty inherent in the invention.

I claim:

1. An improved process for producing valuable conversion products from CO and $H_2$ in the presence of iron type catalysts which comprises contacting CO and $H_2$ in synthesis proportions and at synthesis conditions including temperatures of about 550°-750° F. and pressures of about 150-650 lbs. per sq. in. adapted to the formation of normally liquid hydrocarbons with a dense turbulent fluidized mass of a catalyst which essentially consists of a reduced composite of about 80 parts by weight of chromia, 20 parts by weight of iron oxide and 2 parts by weight of potassium carbonate.

2. An improved process for producing valuable conversion products from CO and $H_2$ in the presence of iron type catalysts which comprises contacting CO and $H_2$ in synthesis proportions and at synthesis conditions including temperatures of about 550°-750° F. and pressures of about 150-650 lbs. per sq. in. adapted to the formation of normally liquid hydrocarbons, with a dense turbulent fluidized mass of a catalyst which essentially consists of a reduced composite of fluidizable particle size, of about 60-90 wt. per cent of chromia, about 5-40 wt. per cent of iron oxide and about 0.5-5 wt. per cent of an alkali metal compound promoter.

3. The process of claim 2 in which said promoter is potassium carbonate.

ISIDOR KIRSHENBAUM.

REFERENCES CITED

The following references are of record in the file of this patent:

UNITED STATES PATENTS

| Number | Name | Date |
|---|---|---|
| 2,180,672 | Frey | Nov. 21, 1939 |
| 2,253,607 | Boyd et al. | Aug. 26, 1941 |
| 2,261,184 | Roelen et al. | Nov. 4, 1941 |
| 2,301,687 | Dorschner | Nov. 10, 1942 |
| 2,398,462 | Roelen | Apr. 16, 1946 |
| 2,406,864 | Thomas | Sept. 3, 1946 |
| 2,417,164 | Huber, Jr. | Mar. 11, 1947 |
| 2,455,419 | Johnson | Dec. 7, 1948 |

Certificate of Correction

Patent No. 2,509,869

May 30, 1950

ISIDOR KIRSHENBAUM

It is hereby certified that error appears in the printed specification of the above numbered patent requiring correction as follows:

Column 4, line 40, for "chromina" read *chromia*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*